United States Patent [19]

Koppelaars

[11] Patent Number: 4,894,049
[45] Date of Patent: Jan. 16, 1990

[54] TRANSMISSION BELT, CROSS ELEMENT FOR A TRANSMISSION BELT AND METHOD AND DEVICE FOR THE PRODUCTION THEREOF

[75] Inventor: Willem Koppelaars, Oisterwijk, Netherlands

[73] Assignee: Van Doorne's Transmissie B.V., Tilburg, Netherlands

[21] Appl. No.: 146,872

[22] Filed: Jan. 22, 1988

[30] Foreign Application Priority Data

Jan. 23, 1987 [NL] Netherlands .......................... 8700156

[51] Int. Cl.$^4$ ............................................... F16G 1/22
[52] U.S. Cl. ...................................... 474/240; 474/242
[58] Field of Search ............... 474/201, 240, 242, 244, 474/245

[56] References Cited

U.S. PATENT DOCUMENTS 4,299,586 11/1981 Van der Hardt Aberson .... 474/201
4,303,403 12/1981 Lamers .......................... 474/242 X
4,633,617 1/1987 Van Dijk ............................. 51/73 R
4,692,985 9/1987 Van Dijk ........................ 474/201 X

FOREIGN PATENT DOCUMENTS 0014482 6/1980 European Pat. Off. .
0143293 6/1985 European Pat. Off. .
8303870 11/1983 Netherlands .

Primary Examiner—Thuy M. Bui
Attorney, Agent, or Firm—Pennie & Edmonds

[57] ABSTRACT

Cross element for an assembled transmission belt, said cross element bearing with its main sides against the main sides of abutting cross elements in mounted condition, whereby the surface of at least one main side shows at least three calibrated, separated surfaces lying in one and the same plane, which are elevated relatively to the immediate surroundings of the surfaces, said plane being perpendicular to the linear direction of movement of the transmission belt during operation.

7 Claims, 3 Drawing Sheets

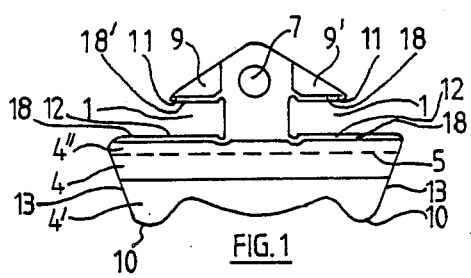
FIG. 1
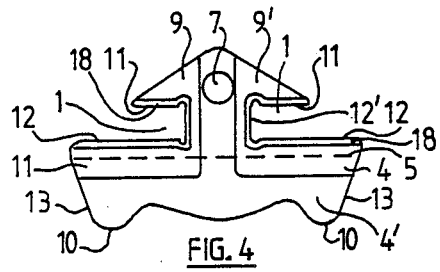
FIG. 4
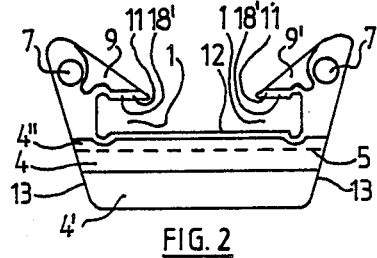
FIG. 2
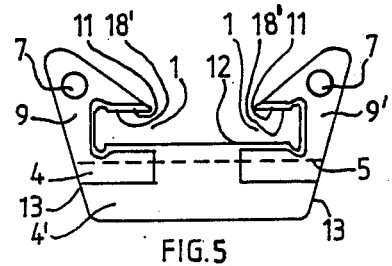
FIG. 5
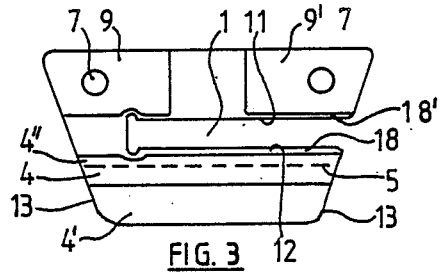
FIG. 3
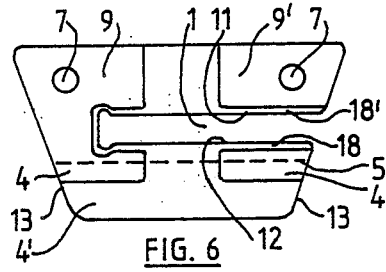
FIG. 6
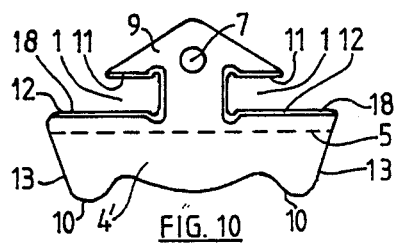
FIG. 10
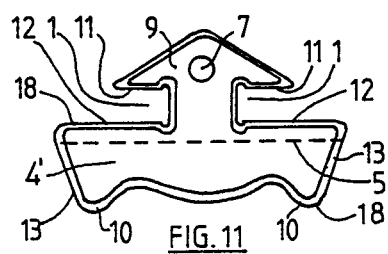
FIG. 11
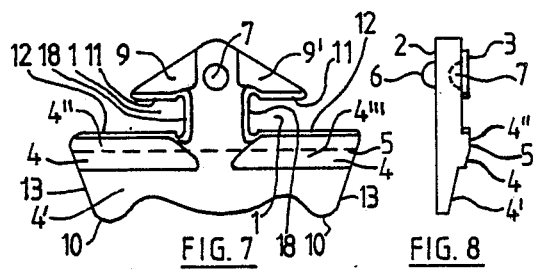
FIG. 7    FIG. 8    FIG. 9
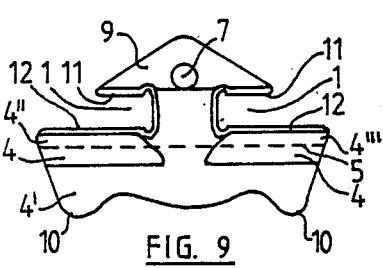

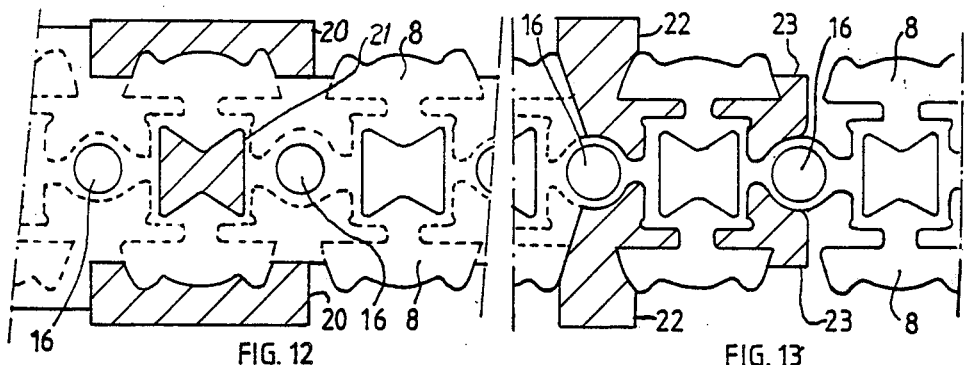
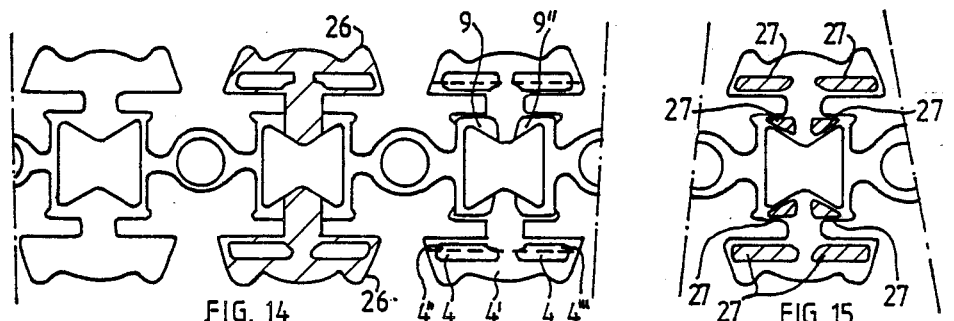
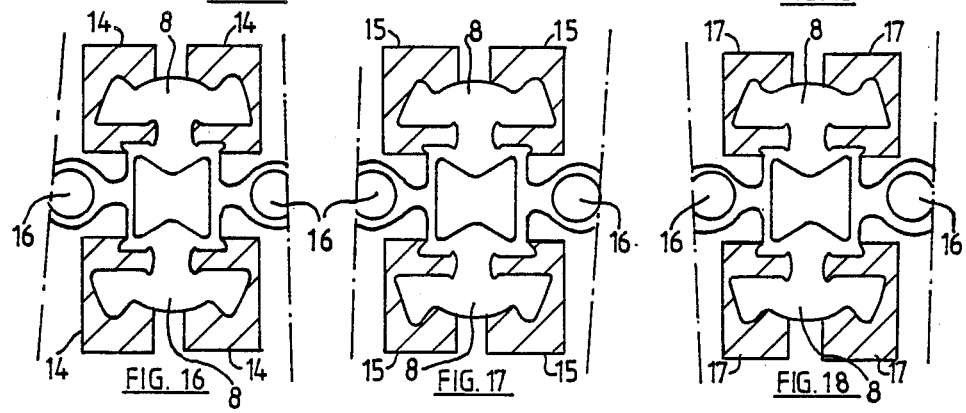
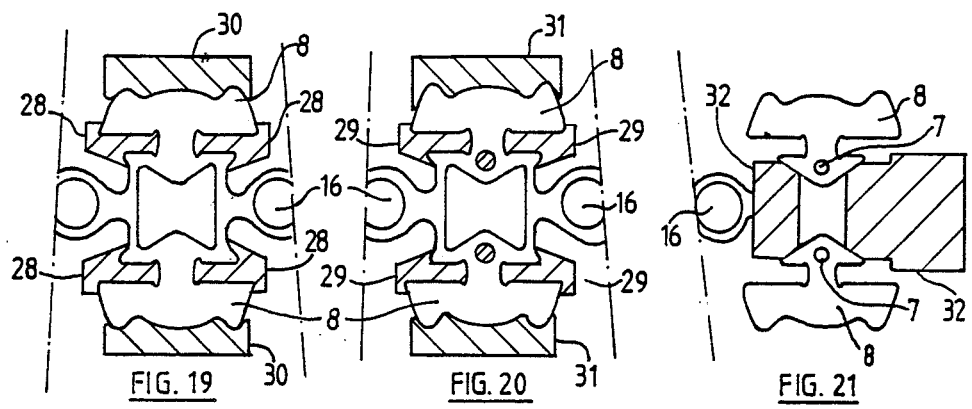

TRANSMISSION BELT, CROSS ELEMENT FOR A TRANSMISSION BELT AND METHOD AND DEVICE FOR THE PRODUCTION THEREOF

BACKGROUND OF THE INVENTION

1. Field of the Invention

The invention relates to an improved cross element for a transmission belt for a continuously variable speed regulator, in particular to be used in a transmission system, and to an improved method for the production thereof.

2. Description of the Prior Art

A cross element of the kind referred to is e.g. known from EP No. 0 014 492 and EPA No. 0 143 293. A transmission belt as referred to here has a substantially trapezoidal section for use on V-shaped pulleys and consists of an endless carrier in the shape of at least one metal band and of a number of cross elements butting against each other with the parallel parts of their main sides and provided displaceably on the carrier. With the transmission belts known up to now and the cross elements used therein satisfactory results were attained. A drawback of the existing transmission belts is that on passing over the pulleys the stability is not satisfactory at some speeds, which manifests itself in vibrations in directions perpendicular to the direction of movement in the linear part between the pulleys (see FIG. 26).

When the invention was being conceived it appeared that part of the problems could be traced back to an insufficient plan-parallelism of the cross elements in mounted condition. Besides that there is the problem that the production rate of cross elements made with great precision is experienced as being insufficient.

Up to now cross elements have been made by blanking them out of pre-profiled strip material. This is a relatively slow process. The inventors felt the need to replace this process by the so-called "Progressive Die" technique, which method can lead to high production rates. It became apparent to them, however, that the use of this technique is not suitable for the cross elements known so far, because the dimensional accuracy of the elements obtained is insufficient or can only be achieved with too great an effort.

SUMMARY OF THE INVENTION

It has been found now that in principle both drawbacks can be removed by taking one measure. On the one hand this measure leads to a transmission belt with an improved stability, on the other hand it makes the use of the progressive die technique for the manufacture of cross elements possible, making it possible again to bring about improvements in the production system of cross elements.

Said measure implies that the progressive die provides three calibrated surfaces, lying in one and the same plane, on at least one main side of a cross element already partly blanked in a metal strip, said surfaces being elevated relatively to their immediate surroundings (said plane being perpendicular to the linear direction of movement of the transmission belt during operation). When the invention was being conceived it became apparent that this island formation on a cross element can be carried out relatively easily with a progressive die, as well as the calibration into parallel surfaces. Furthermore it became apparent islands lying in one and the same plane on the surface of at least one main side, produce transmission belts which are more stable during operation than transmission belts having cross elements that do not have said islands.

According to the idea governing the invention a further embodiment of a cross element is characterized in that the surface of at least one main side shows two calibrated, separated surfaces lying in one and the same plane and being elevated relatively to their immediate surroundings, said surfaces lying on both sides of the axis of symmetry of the element, said mutual plane of the calibrated surfaces being perpendicular to the linear direction of movement of the transmission belt during operation. It has appeared that in practice good results can be achieved with such an element having two separated calibrated surfaces on both sides of the axis of symmetry, in the sense that the main cause of the occurrence of vibration of the belt in one direction parallel to the axes of the pulleys is largely eliminated.

According to the idea governing the invention another variant of the cross element is characterized in that a recessed edge is provided at at least one of the main sides along at least part of the circumference of the element. If said edge is provided along the entire circumference it will facilitate the stamping and calibration of the surface surrounded by said edge, because superfluous material, which is forced out by the stamping, and any burrs can be received in said recessed edge and thus cannot have a disadvantageous influence on the functioning of the element during operation.

A preferential embodiment of the cross element according to the invention is characterized in that at least two of the separated surfaces are present on the upper side, i.e. that part of the element which does not come into contact with the pulleys during operation and which is located on the one side of the recess(es) for receiving the band pack (the band packs) of the cross element, on both sides of the axis of symmetry thereof and that the surface(s) on the bottom side of the cross element, i.e. that part of the cross element which comes into contact with the pulleys during operation and is located on the other side of the recess(es) for receiving the band pack(s), has a smoothly blending tilting zone at the spot of the tilting line.

Furthermore it became apparent that when the propressive die technique is introduced the following improvements with regard to he further finishing of the cross elements could furthermore be brought about: because according to the invention a flat metal strip instead of a profiled strip is subjected to a number of successive cutting and stamping operations in a progressive die with a number of operating stations, in each of which an operation or a combination thereof is carried out, after which the elements are finally cut loose from the strip;

because according to the invention (a) the elevated surfaces are provided in one and the same station simultaneously with the formation of a conical bottom side of the cross element (b) in the next station the surfaces of the islands are calibrated, such that the surfaces will lie in one plane and a smoothly blending tilting zone is provided at the spot of the tilting line and as a result of which (c) it becomes possible to provide the definitive configuration during finishing operations;

because according to the invention the cross element is subjected, after calibration and the provision of the tilting zone, to a planing operation in a number of follow-on stations at least at the spot where one side blends into an elevated surface, in order to remove material from the cross element and from at least part of the burr, after which the remainder of the burr is possibly removed in a following station, which was not possible in prior processes;

because according to the invention the remainder of the burr along the boundaries of the saddles is forced out into the space in front of the elevated surfaces by bevelled dies operating in opposition. As a result it is achieved that the element can be completely produced and finished in one and the same device, contrary to the known methods, whereby the element had to be set up in several processing devices, which had an adverse effect on the rate of output and the manufacturing costs.

By using the method according to the invention it is also possible to start from simple, flat strip material instead of profiled strip material, as a result of which a further simplification is attained.

Also it is possible according to the invention to simply achieve the desired dimensional accuracy for those surfaces where an accurate dimensioning is required, especially those surfaces that come into contact with the pulley and with the band pack. According to the invention this accuracy is achieved by planing operations with a successively increasing accuracy. By the use of bevelled dies, operating in opposition, it is achieved that the remainder of burrs along the boundaries of the saddles (that part of the element which lies between the pulleys against the band pack) and the ear (that part of the element which butts against the band pack, when the element is drawn from the pulley) and the connecting piece between saddle and ear (body) is forced out, and it is achieved that the surfaces of the element, which come into contact with a band pack during operation become somewhat convex, which has the same effect as the solution offered according to the Dutch patent application No. 8303870, open to public inspection, which comprises a separate grinding operation.

A further variant of the cross element according to the invention has, at at least one main side, two calibrated surfaces, separated from each other, lying in one and the same plane and being elevated relatively to their immediate surroundings, said surfaces being located on both sides of the space(s) for receiving the carrier. This embodiment will be effective for preventing vibrations in the direction Y - Y' (FIG. 26), particularly with cross elements, especially in those cases where the height of the element is of the same magnitude as the width, or greater.

BRIEF DESCRIPTION OF THE DRAWINGS

In explanation of the invention a description of the invention will be given hereinafter, with reference to the drawing of embodiments of the cross element according to the invention and an embodiment of the method and device according to the invention.

In the drawing:

FIGS. 1-7 and FIGS. 9-11 are front views of three types of cross elements, embodying various variants of the invention;

FIG. 8 is a side view of the cross element according to FIG. 7;

FIGS. 12-21 are diagrammatic views in illustration of the method and device according to the invention;

DETAILED DESCRIPTION OF THE PREFERRED EMBODIMENTS

Figure 22:
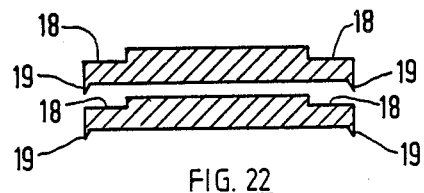
FIG. 22 is a section of the tilting line of the cross element according to FIG. 11.

Corresponding parts are illustrated with the same reference numbers in the various embodiments.

The cross element illustrated in the FIGS. 1, 4, 7, 9, 10, 11 and 25 is of a type whereby the transmission belt is provided with a carrier consisting of two endless bands which are slid from both sides into the recesses 1 of the cross elements. The cross element has two main sides 2 and 3 which come into contact with the main sides of preceding and following cross elements lying in front and behind. The main side 3 is provided with a bevel 4 (4'). The transition from the parallel part of side 3 to the bevel is a roll-off zone or tilting line 5, which makes it possible for the transmission belt to follow an approximately semicircular path between two pulley halves. The surfaces 4 then come into contact with the sides 2 of preceding and following elements.

The cross element is provided with coupling means in the shape of a projection 6 on side 2 and a recess 7 in side 3. The surfaces of which a more accurate dimensioning is required are those which come into contact with the endless carrier (11, 12, 12'), and those which co-operate with the V-shaped pulleys (13), and those which serve as reference surfaces for further operations (10). Said surfaces are blanked with a certain oversize in the various operating stations of the progressive die. This superfluous material is then planed off in successive operations in two or three operating stations of the die in order to attain the desired dimensional accuracy. In the final operating station approximately 0.05 mm is further removed, whilst an original oversize of approximately 0.40 mm was present. Removal thereof generally requires three operating stations in which 0.25 mm, 0.10 mm and 0.05 mm are successively removed.

For the embodiment according to the FIGS. 2 and 3, 5 and 6 respectively corresponding considerations apply, however, these embodiments are constructed in order to co-operate with a single endless band.

FIG. 1 illustrates a variant of the cross element according to the invention, which is provided with three separated calibrated surfaces, two of which being present on the upper part of the cross element (9, 9'), located above the recesses 1 for receiving the endless carrier, and one being present on the lower part of the element, located under the recesses 1 for receiving the endless carrier. Along the faces 12 (saddle faces) and along the calibrated surface (4, 4", 5) a recessed part 18 is provided, in which superfluous material running off during calibration of the surface 4" can be received. At the same time a burr, if present, can be forced out here, which can no longer influence the functioning of the element then, because said burr can no longer come into contact with the main side of an adjacent element. A corresponding recessed edge 18' is present along the face 11 at the upper parts of the element, also called ear. For said edge the same considerations apply as for the recessed part along the saddle face 12.

The variants illustrated in the FIGS. 2 and 3 are cross elements, suited for co-operation with a single endless band pack. Said bend pack is received in the recesses 1, the calibrated surface (4, 4") again has a roll-off zone or tilting line 5. The surface 4 lies at such an angle that the element has sufficient room for tilting about the tilting line 5 when it comes into contact with the pulleys during operation. The face 4' lies at a corresponding angle. The elevated, calibrated surfaces 9 and 9' are provided such that they do not envelop the recesses 7 in FIG. 2. It is also possible, however, to have the recesses 7 enveloped by the two elevated calibrated surfaces 9 and 9', as is illustrated in FIG. 3. The embodiments illustrated in the FIGS. 1, 2 and 3 each show three separated calibrated surfaces, whereby the lowermost calibrated surface (4, 4") does not necessarily extend over the entire width of the element. It may be desirable to dimension the surface 4, 4" such that it only extends over part of the width of the element, as a result of which a better operation can be achieved with a view to preventing vibrations.

The FIGS. 4, 5 and 6 illustrate cross elements according to the invention having separated, elevated, calibrated surfaces, which are located on both sides of the axis of symmetry of the cross element (FIG. 4, FIG. 5), whereby in FIG. 6 there are three elevated calibrated surfaces present, one of which being located on one side of the axis of symmetry and the other on the other sides. The embodiments according to the FIGS. 4, 5 and 6 are particularly effective for preventing vibrations of the transmission belt during operation in a directional parallel to the axes of the pulleys. Especially the embodiments according to the FIGS. 4, 5 and 6 will be effective in those cases where the width dimension is greater than the height dimension, because in that case vibrations in a direction parallel to the axes of the pulley will prevail. Along the saddle face 12 and at the bottom side of the ear, along the face 11, there is again a recessed edge (18, 18'), as well as along the intermediate connecting part between saddle face end ear, which edge has the functions described above.

FIG. 7 illustrates a variant of the cross element according to the invention, suited for a carrier with two band packs which are each received in the recess 1, said cross element being provided with 4 calibrated, separated surfaces (9, 9', 4", 4'"), lying in one and the same plane. Along the faces which come into contact with the carrier (11, 12), and along the connecting part between ear and saddle, there is also provided a recessed edge (18). The faces 4 and 4' are again at the desired angle relative to the main sides of the carrier. The cross element according to FIG. 7 has all the advantages described hereinabove. In FIG. 7 reference number 18 indicates the recessed edge along the saddle face 12 and the bearing face for the band along the ear. In the remaining figures reference number 18 also generally indicates the recessed part or the edge along the saddle face 12. In certain embodiments said recessed part or the edge 18 may extend over the edge along the bearing face 11 at the ear and over the connecting part between the two bearing faces. The reference number 18' generally indicates the recessed part along the bearing face 11 at the ear.

FIG. 9 illustrates an embodiment of a cross element according to the invention which is provided with three calibrated surfaces, one of which being present on the upper part of the cross element (9) and two being present on the lower part of the cross element (4", 4'"). A correct choice of the dimensions of said calibrated surfaces will also effectively prevent vibrations of the belt during operation. If desired a recess may again be provided around the projection 7 in order to aid the disconnection of the recess 7 and the projection 6 from each other on entry of the element between the two pulley halves during operation of the belt.

With regard to the side view of the cross element according to FIG. 7, illustrated in FIG. 8 it may furthermore be noted that the face 4' does not necessarily have to be at an angle, provided said face 4' is recessed sufficiently in order to prevent it from coming into contact with the main face 2 of the adjacent element during the tilting movement between the pulleys.

Figure 25:
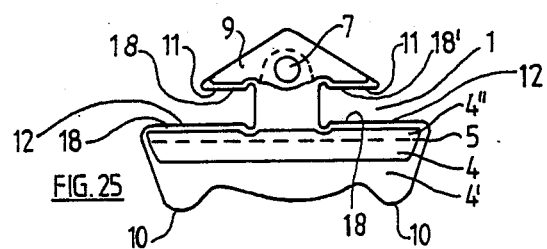
FIG. 25 is a front view of a cross element according to the invention with two elevated calibrated surfaces.
Figure 26:
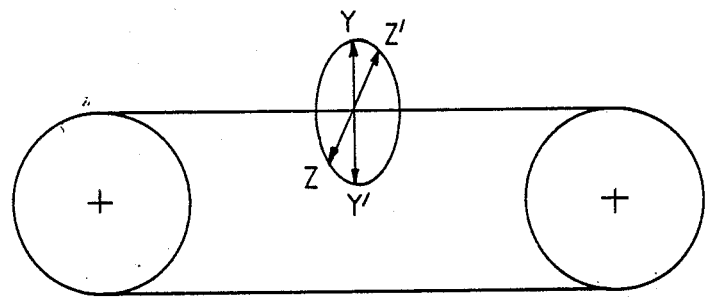
FIG. 26 is a diagrammatic view of a transmission belt with pulleys.

FIG. 25 illustrates a cross element according to the invention, whereby two calibrated elevated surfaces 9 and 4, 4" are present. If desired the calibrated surface 9 may be provided such that the projection 7 is not enveloped by it, as is indicated with a dotted line in the upper part of the element. This embodiment effectively prevents vibrations in a direction y - y' in the plane perpendicular to the linear direction of movement of the carrier (FIG. 26).

FIG. 10 illustrates a further variant of the cross element according to the invention, which is provided, as it were, with a single calibrated surface 9, 4'. By providing the recessed edge 18 along saddle face and ear and the intermediate connecting part (body) a room is created for receiving burrs, which would have been difficult to remove, in particular along those parts of saddle face, ear and intermediate part along which the recessed edge 18 is provided. Besides the recessed edge 18 creates room for receiving superfluous material which must be able to flow off during calibration of the face 9. In the variant of the cross element according to the invention, illustrated in fig 11, the recessed edge 18 is provided along the entire circumference of the element and the element has one single calibrated surface 9, 4' again, as it were. Especially when the height and the width of the cross elements according to the FIGS. 10 and 11 are not too great good results may be attained. FIG. 22 again diagrammatically illustrates the function of the recessed edge 18 for receiving burrs 19. Excess material, which flows off sideways from the surface surrounded by the edge 18 during stamping, finds sufficient room in the recessed edge 18.

FIGS. 12-21 diagrammatically illustrate the method and the device according to the invention.

In FIG. 12 strip-shaped material is supplied to a blanking device having dies 20 and 21. Contour lines of the element which have not been blanked yet are indicated by dotted lines, whilst blanked contour lines are drawn as full lines. Reference number 8 indicates the partly blanked out element. In FIG. 12 the element 8 is partly blanked out by means of the dies 20 and 21. Centring holes 16 provide a correct centring of the material. FIG. 13 illustrates the further blanking out of the element by means of the dies 22 and 23. When the material has been processed in the station illustrated in FIG. 13 two elements 8 have been produced, connected together with the ear parts and being connected to rings in which the centring hole 16 is present.

Figure 23:
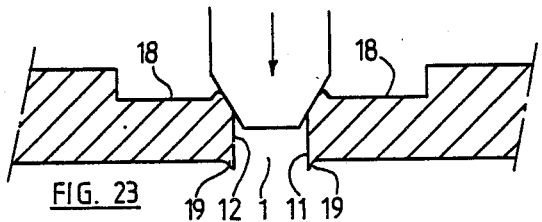
FIGS. 23 and 24 are views of the bevelling of the saddle face and the contacting surface of the ear for the band pack respectively, whereby at the same time any present burrs are forced out.
Figure 24:
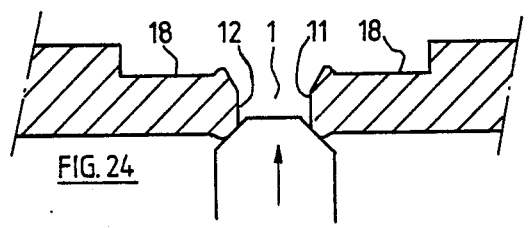

According to the method the bevel 4' is produced by exerting die pressure in an operating station with a progressive die 25, 26, as is diagrammatically illustrated in top view. In said station the parts 4' are bevelled at an angle op approximately 5° from the tilting line 5, which is indicated by a dotted line in the figures. At the same time it can be seen from this figure how each element is provided with a pair of elevations 9, 9' and a pair of elevations (4'', 4''') at the main parts to be partly bevelled. These four (9, 9' and 4'', 4''') elevations come into contact with the smooth main side of the adjacent element which prevents the elements from tilting relatively to one another in any different manner than about the tilting line 5, which is not yet provided in FIG. 14 for that matter. The elements will finally look as indicated in the FIGS. 7 and 8. The elevations 9, 9', 4'' and 4''' extend to a point near the faces 11 and 12 bounding the rooms 1 in which the endless bands are provided. Near said faces 11 and 12 the thickness therefore decreases relatively to the original thickness. When the edges of said cut surfaces are deformed with a bevelled die in order to obtain a certain "convexity" of the faces 11 and 12, as the FIGS. 23 and 24 diagrammatically illustrate, the forced out material can collect in the U-shaped edge 18. Said U-shaped edge may otherwise also serve to render a burr 19 innocuous, which consequently does not need to be removed, as diagrammatically illustrated in FIGS. 22 and 23.

Then, according to FIG. 15, the faces 9 and 9' are stamped and calibrated with the die 27 in the progressive die, such that said faces extend plan parallel to the other main sides of the element. The faces 4'' and 4''' are calibrated in corresponding manners, whilst at the same time the tilting line 5 is provided, so that the faces 4 extend at the desired angle.

FIGS. 16, 17 and 18 diagrammatically illustrate the stations for the accurate finishing of the faces 10, 11, 12 and 13. The partly blanked out element is indicated by 8 and 16 furthermore indicates centring holes. Four punches 17 (14, 15), having a substantially U-shaped section, provide the finishing operations required, whereby at the same time any burrs which were produced in preceding blanking stations, are removed and 0.25 mm, 0.10 mm and 0.05 mm are successively removed from the faces 10, 11, 12 and 13 and from the face and the body.

The progressive die 28 according to FIG. 19 and the progessive die according to FIG. 20 provide the bevels, which are illustrated in the FIGS. 23 and 24 on the faces 11 and 12 respectively, whereby the sequence of the provision of the bevels is not relevant. Reference numbers 30 and 31 indicate clamping device which hold the element during the bevelling operation. In the progressive die according to FIG. 20 the recess 7 or the projection 6, also called hole and dimple respectively, may finally be provided. In FIG. 21 finally a complete release of the element 8 is achieved by means of the die 32. Owing to the measures described a cross element is obtained which can be completely finished in the progressive die described. In particular it is no longer necessary to grind the bearing surfaces of the carrier, and also tumbling for removing burrs no longer needs to take place. Not only does this have an advantageous effect on the productivity, but also the stability of the transmission belt becomes greater, especially in the linear parts of its path. Vertical vibrations are effectively prevented by using the invention.

I claim:

1. Cross element for a transmission belt having an endless carrier in the form of at least one metal band and a plurality of said cross elements, said cross element comprising at least two main sides and at least one recess for receiving the carrier, a bevel extending radially inwardly with respect to the belt for enabling bending of the transmission belt, whereby said bevel passes into the main side by a tilting line, at least three calibrated, separated, mutually parallel surfaces provided on at least one of said main sides, said surface being at substantially the same level relative to each other, whereby adjacent cross elements abut against each other, respectively with said main side and with said at least three surfaces.

2. Cross element according to claim 1, wherein said cross element is substantially symmetrical to an axis of symmetry, and at least two of said calibrated, separated, mutual parallel surfaces are positioned on opposite sides of said axis of symmetry of said element.

3. Cross element according to claim 1, wherein at least two of said calibrated, mutual parallel surfaces are positioned on opposite sides of saidi recess for receiving said carrier.

4. Cross element according to claim 1, wherein said element is symmetrical to an axis of symmetry, and at least two of said calibrated separated surfaces extend radially outwardly with respect to said tilting line, on opposite sides of said axis of symmetry, said third calibrated, separated surface being provided at said tilting line and said third calibrated, separated surface being provided with a corresponding tilting line.

5. Cross element according to claim 1, wherein a recessed edge is provided at at least one of said main sides, along at least part of said element.

6. Cross element according to claim 1, wherein said tilting line is at least partly being provided on at least one of said calibrated surfaces.

7. Cross element for a transmission belt, which transmission belt comprises an endless carrier in the form of at least one metal band and a plurality of said cross elements, each said cross elements being provided with at least two main sides and at least one recess for receiving said carrier, each said cross elements having a bevel extending radially inwardly with respect to said belt for enabling bending of said transmission belt, whereby said bevel passes into the main side by a tilting line, characterized in that on at least one of said main sides at least three calibrated, separated, mutual parallel surfaces are provided, said surfaces being at substantially the same level relative to each other, whereby neighboring cross elements abut against each other, respectively with said main side and with said at least three surfaces.

* * * * *